US009436999B2

(12) United States Patent
Cieplinski et al.

(10) Patent No.: US 9,436,999 B2
(45) Date of Patent: *Sep. 6, 2016

(54) AUTOMATIC IMAGE ORIENTATION AND STRAIGHTENING THROUGH IMAGE ANALYSIS

(71) Applicant: Apple Inc., Cupertino, CA (US)

(72) Inventors: Avi Cieplinski, San Francisco, CA (US); Jan Erik Solem, San Francisco, CA (US); Jerremy Holland, Los Altos Hills, CA (US); Garrett Johnson, San Francisco, CA (US); Russell Reid, Palo Alto, CA (US); Russell Webb, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,017

(22) Filed: Sep. 18, 2015

(65) Prior Publication Data

US 2016/0012578 A1     Jan. 14, 2016

Related U.S. Application Data

(63) Continuation of application No. 13/610,101, filed on Sep. 11, 2012, now Pat. No. 9,177,360.

(51) Int. Cl.
*G06K 9/36* (2006.01)
*G06T 7/00* (2006.01)
*G06T 3/60* (2006.01)
*G06T 11/20* (2006.01)

(52) U.S. Cl.
CPC ............. *G06T 7/004* (2013.01); *G06T 3/60* (2013.01); *G06T 7/0024* (2013.01); *G06T 7/0042* (2013.01); *G06T 11/203* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| 5,596,657 | A | 1/1997 | Choi |
| 6,009,199 | A | 12/1999 | Ho |
| 6,137,905 | A | 10/2000 | Takaoka |
| 7,340,110 | B2 | 3/2008 | Lim |
| 7,375,755 | B2 | 5/2008 | Oya |

(Continued)

OTHER PUBLICATIONS

Criminisi, A., et al., "Decision Forests for Classification, Regression, Density Estimation, Manifold Learning and Semi-Supervised Learning," Microsoft Research technical report TTR-2011-114, Oct. 28, 2011.
International Search Report received in PCT Application No. PCT/US2013/051326, dated Sep. 16, 2013.

(Continued)

*Primary Examiner* — Sean Motsinger
(74) *Attorney, Agent, or Firm* — Blank Rome LLP

(57) ABSTRACT

Systems, methods, and computer readable media for adjusting the orientation of an image frame and a scene depicted in the image frame are described. In general, techniques are disclosed for analyzing an image with one or more feature detectors to identify features in the image. An alignment or position associated with one or more features identified in the image may be used to determine a proper orientation for the image frame. The image can then be rotated to the proper orientation. It may also be determined if a scene depicted in the image is properly aligned in the rotated image orientation. If not, alignment information associated with the identified features may be utilized to straighten the depicted scene.

20 Claims, 10 Drawing Sheets

(56) References Cited

U.S. PATENT DOCUMENTS

| | | | |
|---|---|---|---|
| 7,844,135 B2 | 11/2010 | Steinberg | |
| 2006/0204034 A1* | 9/2006 | Steinberg | G06T 7/0042 382/103 |
| 2007/0098303 A1 | 5/2007 | Gallagher | |
| 2007/0229695 A1 | 10/2007 | Kato | |
| 2008/0152199 A1* | 6/2008 | Oijer | G06K 9/00228 382/118 |
| 2008/0317378 A1 | 12/2008 | Steinberg | |
| 2009/0086050 A1* | 4/2009 | Kasakawa | H04N 5/23219 348/222.1 |
| 2010/0048242 A1 | 2/2010 | Rhoads | |
| 2010/0054592 A1 | 3/2010 | Nanu | |
| 2011/0064329 A1* | 3/2011 | Steinberg | G06K 9/00228 382/296 |
| 2011/0249142 A1* | 10/2011 | Brunner | H04N 5/23219 348/229.1 |
| 2012/0162263 A1 | 6/2012 | Griffin | |

OTHER PUBLICATIONS

Ivana Cingovska, et al.: "Automatic Image Orientation Detection With Prior Hierarchical Content-Based Classification," Image Processing (ICIP), 2011 18th IEEE International Conference ON, IEEE, Sep. 11, 2011, pp. 2985-2988, XP032080295, DOI: 10.1109/ICIP.2011.6116289, ISBN: 978-1-4577-1304-0.

Jones, Michael and Paul Viola. 'Fast Multi-view Face Detection.' Mitsubishi Electric Research Laboratories: Cambridge, MA. Jul. 2003. pp. 1-10.

Lei Wang, et al.: "Image Orientation Detection With Integrated Human Perception Cues (Or Which Way is Up)," Proceedings 2003 International Conference on Image Processing (Cat. No. 03CH37429), Barcelona, Spain, Sep. 14-17, 2003; IEEE IEEE Piscataway, NJ, USA, vol. 2, Sep. 14, 2003, pp. 539-542, XP010669736, ISBN: 978-0-7803-7750-9.

Sanketi, Pannag, et al., "Localizing Blurry and Low-Resolution Text in Natural Images," The Smith-Kettlewell Eye Research Institute, San Francisco, CA94115, Feb. 10, 2011.

* cited by examiner

AUTOMATIC IMAGE ORIENTATION AND STRAIGHTENING THROUGH IMAGE ANALYSIS

BACKGROUND

This disclosure relates generally to adjusting the orientation of an image and straightening the scene displayed in the image. More particularly, but not by way of limitation, this disclosure relates to the use of information obtained from the analysis of an image to perform the orientation and straightening operations.

Digital images obtained with an image capture device are often stored with an improper orientation. For example, a user may intentionally rotate an image capture device to obtain an image having a portrait orientation but the device may store all images with a landscape orientation. A subsequent attempt to view or edit the image (on the image capture or another device) may therefore require a manual operation to orient the image properly. As used herein, the proper orientation of an image refers to the orientation of the image frame in which the image scene is depicted in the manner closest to the scene's actual orientation. Typically, an image frame may be oriented according to one of four cardinal orientations (i.e., 0°, 90°, 180°, 270°). While the process of manually adjusting the orientation of a single image is a relatively simple operation, it may be common for a typical user to capture hundreds or thousands of images within a short amount of time. The process of inspecting and adjusting the orientation of each image may be a time-consuming and tedious operation.

Moreover, even after the image is adjusted to its proper orientation, the image scene may not be properly aligned. For example, objects having a vertical alignment (e.g., buildings, people, etc.) may have a non-vertical alignment in the captured image. Therefore, in addition to adjusting the orientation of an image, a user may need to manually straighten the image scene. This process is more complicated than the adjustment of an image's orientation and it may be difficult for the user to achieve a precise adjustment. It would be desirable to automate these time-consuming and difficult image orientation and straightening operations.

SUMMARY

In one embodiment, a method to receive an image, select one or more feature detectors, and analyze the received image with the one or more feature detectors is described. Based on the analysis of the image, an image orientation may be determined. The determination of the image orientation may be based on an in-plane rotational difference between a typical alignment or position of one or more identified features and the alignment or position of the identified features in the received image. The method may further include determining a rotational offset of a scene depicted in the image at the determined orientation and rotating the depicted scene to obtain a straightened image. The adjusted image may be saved in a memory. The method may be embodied in program code and stored on a non-transitory medium. The stored program code may be executed by a programmable control device that is part of, or controls, an image capture device.

In another embodiment, a method for receiving a first image obtained with an image capture device and including positional information that describes an orientation of the image capture device when the first image was obtained is described. The first image may be analyzed with one or more feature detectors to identify one or more features in the image having an in-plane rotational variance with respect to a known typical alignment and an orientation of the first image may be adjusted based on the analysis. A second image obtained with the image capture device and including positional information that describes an orientation of the image capture device when the second image was obtained may then be received. If it is determined that a change in the orientation of the image capture device during the interval between the capture of the first and second images is less than a threshold value, an orientation of the second image may be adjusted according to the adjusted orientation of the first image. The adjusted first and second images may be saved in a memory. The method may be embodied in program code and stored on a non-transitory medium. The stored program code may be executed by a programmable control device that is part of, or controls, the image capture device.

In another embodiment, a method to receive an image having a particular orientation and depicting a scene is described. The received image may be analyzed with one or more feature detectors to identify features within the depicted scene. A feature offset that represents the in-plane rotational difference between an expected feature alignment and an observed feature alignment in the image may be determined for each identified feature. A scene offset may be calculated from the feature offsets and the depicted scene may be rotated based on the scene offset. The method may be embodied in program code and stored on a non-transitory medium. The stored program code may be executed by a programmable control device that is part of, or controls, an image capture device.

DETAILED DESCRIPTION

Figure 1A:
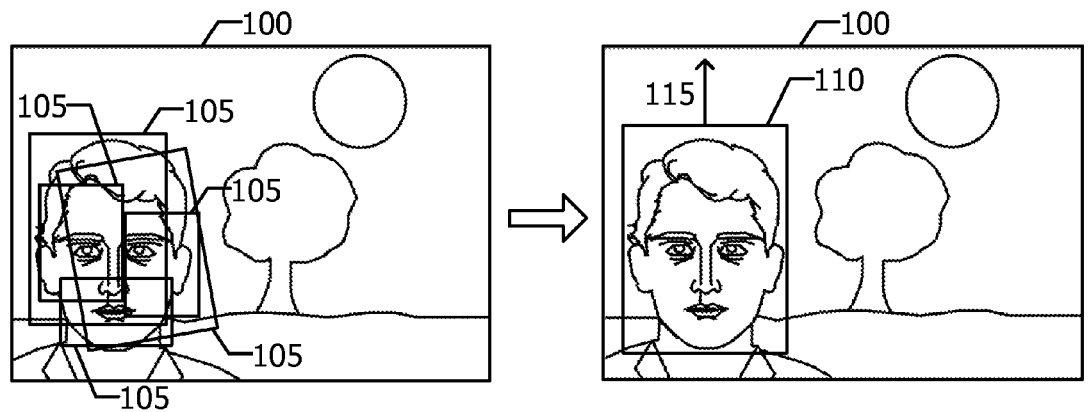
FIGS. 1A through 1D illustrate example feature detectors that may be utilized in accordance with one embodiment of the image orientation and straightening operations described herein.

This disclosure pertains to systems, methods, and computer readable media to automatically modify the orientation of an image based on an analysis of the image. In general, techniques are disclosed for analyzing an image with one or more feature detectors, identifying an orientation and/or position for detected features, and automatically adjusting the orientation of the image frame and the depicted image scene based on the orientations and positions of the detected features.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of image processing having the benefit of this disclosure.

Referring to FIG. 1, several example feature detectors that may be utilized in accordance with the image orientation and straightening operations described herein are illustrated. An image orientation operation refers to the rotation of an image frame to a specified orientation. In general, the image orientation operation is directed to the rotation of an image frame to one of the cardinal orientations (i.e., 0°, 90°, 180°, 270°), but rotation of the image frame to other orientations (e.g., 25°, 95°, 135°, 200°, etc.) may also be performed. Image straightening operations, on the other hand, are used herein to describe the more precise angular adjustment of the photographed scene in an image such that the horizontal/vertical directions in the scene are aligned with the horizontal/vertical directions of the image. Therefore, image orientation refers to the in-plane rotation of an image frame (i.e., the entire image) whereas image straightening refers to the in-plane rotation of a photographed scene with respect to the image.

Referring first to FIG. 1A, a face detector may be utilized to detect one or more faces in image 100. The detection of a face in an image may be based on the application of one or more classifiers to detect characteristic colors, textures, shapes, and other characteristic facial features in the image (e.g., features associated with eyes, noses, and mouths). The various classifiers may be applied to different portions of image 100 and may have different sizes and different angular alignments. In this way, a feature detector may be more likely to detect a face that is rotated about the face-observer axis (in-plane rotation) or about a vertical or horizontal axis with respect to the image (out-of-plane rotation) as opposed to only detecting forward-looking faces. Application of the various classifiers to the different portions of image 100 may result in several candidate regions 105 that are identified as a match for the particular classifier. Each candidate region 105 may have a particular alignment (e.g., an angular alignment with respect to the image) and a classifier confidence (e.g., a likelihood that the candidate region contains the properties associated with the particular classifier). As illustrated in FIG. 1A, candidate regions 105 may converge in one or more portions of image 100 that contain a face. As is further illustrated, the overlapping candidate regions (and their associated confidence levels) may be combined to form a detected feature region 110, having its own associated size, alignment, and confidence metric. Although FIG. 1A illustrates an image that contains a single face, it will be understood that the applied classifiers may result in multiple areas of overlapping candidate regions that result in multiple detected feature regions (each having an associated size, alignment, and confidence metric) in an image that contains multiple faces. The alignment of detected feature region 110 may be described by feature alignment vector 115. Although FIG. 1A illustrates detected feature region 110 as having a vertical alignment, it will be understood that a detected feature region may have an alignment that is rotated with respect to the image (e.g., where a subject in an image is tilting their head to the side). As will be described in greater detail below, feature alignment vector 115 may be utilized to adjust the orientation of image 100 and straighten the depicted scene.

Figure 1B:
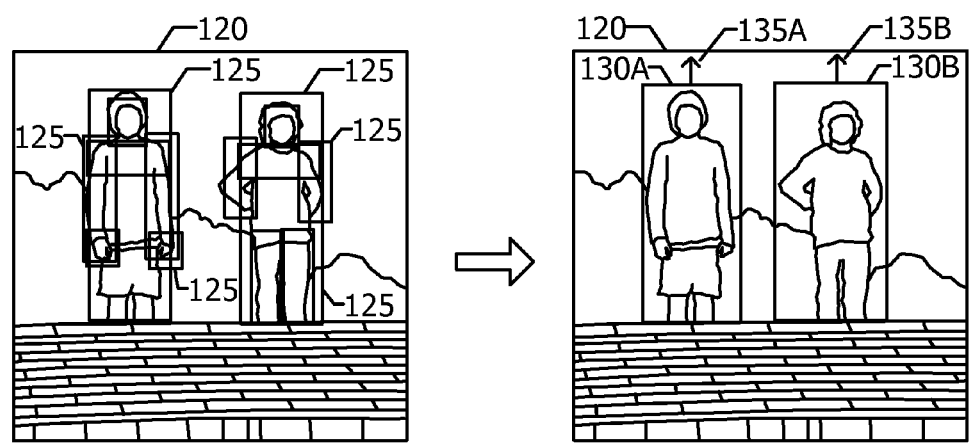

Referring to FIG. 1B, a person detector may work in a similar manner to the face detector described above. Like the face detector, a person detector may utilize multiple classifiers applied to different portions of image 120 to identify people in image 120. For example, a person detector may be based on a collection of classifiers that identify parts of people (e.g., arms, torso, head, clothing patterns, etc.) based on color, texture, shape, relative location with respect to other detected people parts, etc. Like the classifiers utilized to detect a face, the multiple person (or person part) classifiers may be applied to different portions of image 120 having different sizes and different angular alignments and may identify candidate regions 125 having associated sizes, alignments, and confidence metrics. For purposes of clarity, not all of the candidate regions 125 have been labeled. Overlapping candidate regions might then be utilized to derive a detected feature region 130, having its own size, alignment, and confidence metric. As illustrated in FIG. 1B, the overlapping candidate regions 125 may result in the identification of multiple detected feature regions 130 within image 120. The alignment of each detected feature region 130 may be described by feature alignment vector 135. Although face and person detectors have been described in terms of multiple classifiers generating a composite detected feature region, it should be noted that the image orientation and straightening method described herein might also utilize detections based on individual classifiers in order to adjust the orientation of an image and straighten the depicted scene. Moreover, orientation and straightening operations are not limited to face or person detectors. Any object detector configured to identify an object having a principal orientation can be used (e.g., trees, buildings, cars, etc.).

Figure 1C:
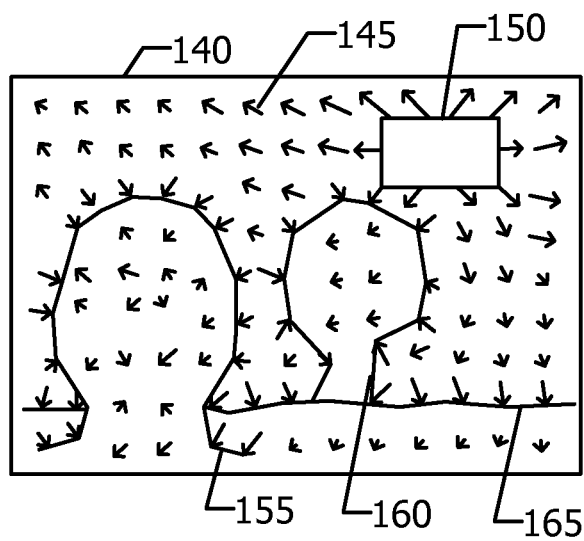

Referring to FIG. 1C, example image gradient map 140 of image 100 is illustrated. In one embodiment, the image orientation and straightening operations described below may take advantage of information that can be extracted from the evaluation of image gradients across an image. As is known by those of skill in the art, image gradient vectors 145 may represent the magnitude and direction of the change in image intensity at each point in image 100. It has been found through extensive evaluation and refinement that image gradient map 140 information may be used to perform image alignment operations. For example, it has been found that image gradient map 140 may be used to provide information as to the location of light source 150. Because brighter areas of an image (such as light source 150) may typically be expected to be located at the top of an image with darker areas (such as shadows) located towards the bottom of an image, the image gradient direction may provide information as to the proper orientation of an image (and straightening of the depicted scene). Although FIG. 1C illustrates an image gradient map and the utilization of image gradients themselves have been described, histograms of image gradients over local areas of an image provide valuable information in terms of the orientation and straightening operations. In addition, local binary patterns (that compute pixel differences in a predefined pattern) are good indicators of the light source direction.

Image gradients might also be useful in identifying edges of objects within image 100 where the image intensity changes sharply. In image gradient map 140, for example, the approximate location of object 155 (the person) and object 160 (the tree) may be identifiable based on an analysis of image gradients. The approximate location of these objects can provide information as to the proper orientation of the image (and straightening of the depicted scene). Image gradient edge detection might also identify edges that represent long image lines. For example, in image gradient map 140, image gradients may identify image line 165 that extends across image 100. Long image lines such as horizon 165 in image 100 may also be useful in determining the proper orientation of an image. Like the face and person detectors described above, features identified based on an analysis of image gradients may be associated with a particular alignment and confidence metric. Accordingly, feature alignment information may allow for the adjustment of the orientation of an image and the straightening of the photographed scene.

Figure 1D:
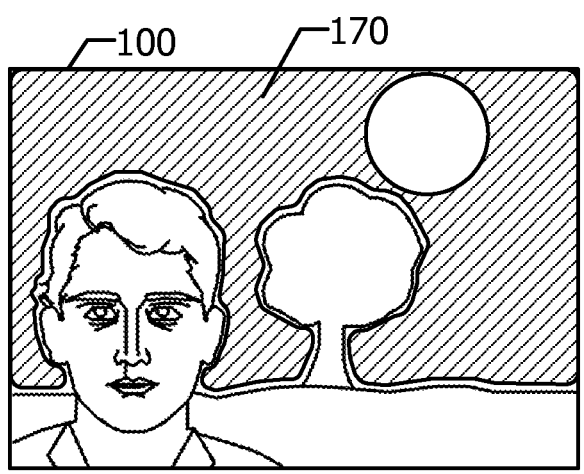

Referring to FIG. 1D, a scene detector may identify a particular type of scene in image 100. In the illustrated embodiment, a sky detector may identify area 170 of image 100 as possessing certain characteristics of a sky. Area 170 may be detected based on color and/or texture properties that are representative of a sky, limited image gradient, and/or other properties that are characteristic of the sky. Because a sky typically appears at the top of an image, the detection of an area having a high likelihood of being a sky may be utilized to adjust the orientation of the image. Although FIG. 1D illustrates a sky detector, other scene detectors such as building detectors, road detectors, grass detectors, etc. may identify scenes within an image in a similar manner. Accordingly, various types of scene detectors may be useful in determining the proper orientation of an image and alignment of the photographed scene.

Although multiple feature detectors have been described with respect to FIGS. 1A-1D, in light of the present disclosure it will be recognized that other types of feature detectors might also provide information that can be used to adjust the orientation of an image and straighten the image's scene. For example, detectors that identify objects such as cars, bikes, signs, text, etc. may provide useful information. As will be described in greater detail below, each detected feature may be associated with a feature alignment and confidence metric that enable image orientation and scene straightening operations in accordance with this disclosure.

Figure 2:
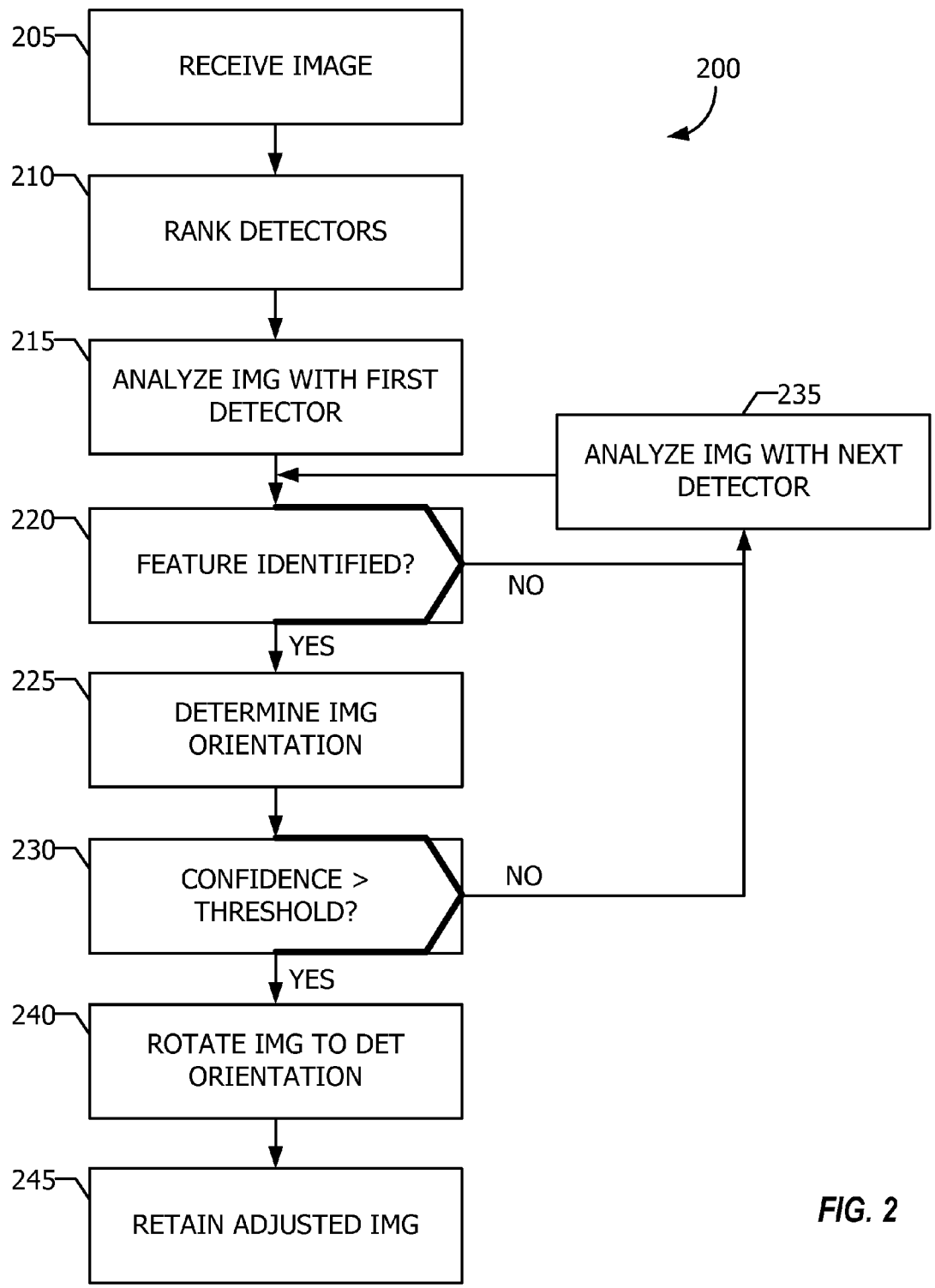
FIG. 2 is a flowchart that illustrates a ranked feature detector image orientation operation in accordance with one embodiment.

Referring to FIG. 2, image orientation operation 200 may be utilized to adjust an image's orientation and may begin with the receipt of an image (block 205). As operation 200 may be performed on an image capture device or on an image editing/viewing/storage device (e.g., a device operating photo management software), receiving an image may include receiving an image that was captured by an image capture device, receiving an image transferred from an image capture device to another device, receiving an image selected for viewing or editing, etc.

After an image is received, multiple feature detectors may be ranked according to the order in which they should be applied to the image (block 210). In a first embodiment, it may be desired to adjust the orientation of an image as quickly as possible. Such an embodiment may be well suited for the adjustment of image orientation on an image capture device in close temporal proximity to the capture of the image. For example, on platforms having limited computational capabilities (e.g., digital cameras, mobile phones, tablet computer devices) it may be desirable to quickly adjust the orientation of an image prior to storing the image in memory that is accessible to the device (in which case the orientation data may be stored in the image file or in an accompanying metadata file). The efficiency-based orientation adjustment embodiment may also be appropriate for the adjustment of image orientations for a large number of images. For example, when a user transfers a large number of images from an image capture device (or memory associated with such device) to a computational platform on which the images may be edited, viewed, or stored (e.g., a personal computer, television, etc.), it may be desirable to quickly adjust the orientation of the transferred images as the images are transferred. Because the efficiency-based orientation adjustment embodiment may be directed to the adjustment of an image orientation as quickly as possible, the detectors may be ranked in order of computational efficiency. For example, a scene detector such as a sky detector may be capable of identifying a sky in an image more quickly than a face detector is capable of identifying one or more faces in the same image. Although the face detector may provide greater accuracy in determining a proper image orientation than a sky detector, the sky detector may be ranked ahead of the face detector for purposes of the efficiency-based orientation adjustment embodiment.

In another embodiment, it may be desirable to adjust an image's orientation according to the accuracy of detectors as opposed to their computational efficiency. Such an embodiment may be suitable for the adjustment of image orientation in an environment in which computational efficiency is not a primary concern. For example, the accuracy-based orientation adjustment embodiment may be utilized to adjust the orientation of images in a photo management application. In accordance with the objectives of the accuracy-based orientation adjustment embodiment, the feature detectors may be ranked according to accuracy rather than computational efficiency. In one embodiment, the ranking of feature detectors may be based on the received image. For example, a quick analysis of the image may be performed prior to ranking feature detectors (e.g., to identify image brightness, etc.) in order to determine whether the image is likely to contain the type of features that may allow a computationally efficient detector to make an accurate orientation determination (e.g., based on the size of the image, image contrast, etc.) or whether an accurate orientation determination is likely to require analysis of the image by a more accurate detector.

After the feature detectors are ranked, the image may be analyzed with the first detector according to the detector ranking (block 215). The first detector may attempt to identify its particular feature within the received image. For example, a sky detector may attempt to identify a sky within the image. If the detector identifies its particular feature within the received image (the "Yes" prong of block 220), an image orientation may be determined based on the detected feature (block 225).

In one embodiment, the determination of an image orientation according to a detected feature may be based on the type of feature detector. For example, a scene detector such as a sky detector may identify a region within the received image as corresponding to the particular feature (e.g., sky). Because a scene may not have an inherent alignment, the detected feature region may not be associated with a feature alignment direction. For example, while a sky detector may detect a region of an image that exhibits the properties of a sky, the detected region may not have an inherent alignment (e.g., the "top" of the sky region may not be identifiable). The proper image orientation based on such a detected feature may therefore be determined according to the position of the detected region with respect to the image as a whole. A different type of feature detector, on the other hand, may be associated with a feature alignment that can be utilized to determine the proper image orientation. For example, a detected face or person may be associated with not only a detected feature region but also a feature alignment vector as described above with respect to FIGS. 1A and 1B. The feature alignment vector may be utilized to determine the proper orientation of the image. Although a scene detector has been described for the purposes of illustrating that an image orientation might be determined based on the position of a detected feature with respect to the image, a scene detector may also have an associated alignment. For example, a sky detector, in addition to detecting a region that has the characteristics of a sky, might also identify the alignment of the sky (e.g., based on an intensity gradient within the detected region).

As discussed briefly above, the determination of the proper orientation of the received image refers to the determination of the in-plane rotation of the image frame. The alignment and/or position of a detected feature, therefore, may be utilized to determine an image orientation that would effect a known typical alignment or position for the detected feature. For example, if a detected feature region associated with a sky detector occupies the left part of a received image in its current orientation, the proper image orientation might be determined to be an orientation in which the image is rotated clockwise 90° from the received orientation such that the detected feature region occupies the top part of the image in the rotated orientation. Likewise, the proper image orientation might be determined to be an orientation in which an alignment associated with a detected feature region (e.g., a direction component of an alignment vector) corresponds to a known typical alignment. For example, if one or more detected feature regions associated with a face or person detector identify an alignment that points to the left side of the received image, the proper image orientation might be determined to be an orientation in which the image is rotated clockwise 90° from the received orientation such that the detected feature alignments are oriented vertically with respect to the image in its rotated orientation. It will be understood that in one embodiment, because the image orientation operation identifies one of four main orientations, it may not be possible (or even desirable) to obtain a feature alignment that is perfectly aligned with the typical alignment. Thus, a feature alignment within a particular angular range may result in the identification of a particular image orientation. For example, a detected feature region associated with a face detector and having a feature alignment value that is rotated 82° clockwise with respect to the vertical axis in the received image orientation may result in a determination that the proper image orientation is the orientation in which the image is rotated 90° counterclockwise from the received orientation such that the face is oriented substantially vertically with respect to the image in its rotated orientation. As will be described in greater detail below, the slightly out of vertical alignment of the detected feature in the rotated orientation may either be identified as proper or corrected through an image straightening operation in a subsequent step.

After an image orientation is determined based on a detected feature, it may be determined if a confidence level in the determined orientation exceeds a threshold confidence value (block 230). In one embodiment, the confidence in a determined image orientation may include measurements of the individual feature detector's confidence in its detection, the accuracy of the detector, and any discrepancies in orientation based on multiple detected feature regions. As described above with respect to FIGS. 1A-1D, a detected feature region and/or alignment may have an associated confidence value. For example, a face detector may determine with an 80% confidence value that a particular region having a particular alignment in an image contains a face. As will be recognized by those of skill in the art, this confidence value may be based on the relationship between properties of the image within the region (e.g., color, texture, etc.) as compared to properties of "known" or "training" features upon which the detector is based. This detector confidence value may feed into the confidence value associated with an image orientation determination.

The confidence value associated with an image orientation determination might also take into account the accuracy of the particular type of detector(s). For example, certain feature detectors might be more accurate at determining an image orientation than others. Accordingly, in one embodiment, a predetermined accuracy may be assigned to each particular detector. Therefore, the confidence in a determined image orientation might be based on a predetermined detector accuracy adjusted based on the detector's confidence in its identification of a feature in an image. By way of example, a detector having an accuracy level of 80% and a confidence level of 80% in a detected feature region may result in a confidence value of 64% in an image orientation determination based on the detected feature. It will be recognized by those of ordinary skill in the art that other confidence algorithms might be applied.

The confidence value associated with a particular determined image orientation might also include a factor to account for discrepancies based on multiple conflicting detected feature regions. Suppose, for example, that a face detector is applied to an image that includes two children. If one of the children in the image is lying down and the other is sitting up, the face detector may identify two detected feature regions with associated alignment values that are approximately orthogonal. Although each face may be detected with a high degree of confidence, there can be almost no confidence in the proper orientation of the image based solely on the detected face regions. Accordingly, the confidence value associated with a determined image orientation may be decreased where two or more detected features suggest divergent image orientations. The confidence value associated with the determined image orientation may be compared with a predetermined threshold value. If the confidence value exceeds the threshold (the "Yes" prong of block 230), the image may be rotated to the determined orientation (block 240) and stored in a memory in the rotated orientation (block 245). In one embodiment, the image rotation operation may be capable of being "undone" by a user such that the image may be returned to its original orientation. If it is determined that the detector did not identify its particular feature or that the confidence in a determined orientation does not exceed the threshold (the "No" prongs of blocks 220 and 230, respectively), the received image might be analyzed with the next detector in the list of detectors (block 235).

Figure 3:
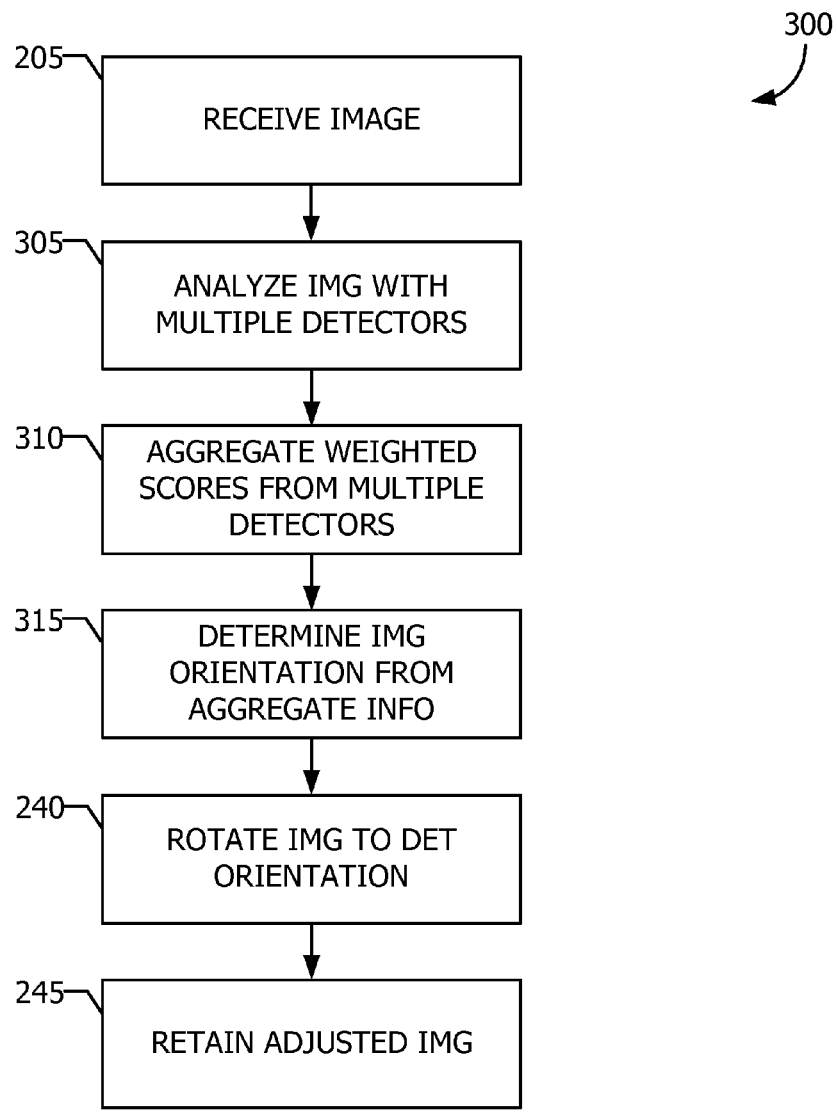
FIG. 3 is a flowchart that illustrates a multiple feature detector image orientation operation in accordance with one embodiment.

Referring to FIG. 3, in still another embodiment, multiple detector image orientation operation 300 may utilize multiple feature detectors to determine an appropriate image orientation. Operation 300 may be capable of identifying a proper image orientation with a high degree of accuracy because it combines feature detection information from multiple applied feature detectors. Operation 300 may differ from operation 200 in that feature detectors may not be applied in a particular order (e.g., may not be ordered according to computational efficiency or accuracy). In fact, application of multiple feature detectors to a particular image may not even occur in close temporal proximity. For example, operation 300 may utilize information available from the previous application of multiple feature detectors to an image in order to identify a proper image orientation. Accordingly, operation 300 differs from operation 200 in that an image orientation determination is not made based on the application of a single feature detector. Rather, an image is analyzed with multiple feature detectors (block 305) and feature identification information (e.g., detected feature regions, confidence values, etc.) from the multiple detectors is utilized to make an image orientation determination. The feature identification information associated with each of the applied detectors may be saved as metadata associated with the received image (either part of, or separate from, the image). In one embodiment, the multiple feature detectors applied to an image may be a predetermined group of detectors that are known to combine well to determine a proper image orientation.

In one embodiment, the feature identification information associated with each applied feature detector may be assigned a weight. The weight applied to each feature detector may be similar to the confidence values described above. For example, the weight may include a predetermined detector accuracy value, a confidence value based on the application of the detector to the received image, and a factor to account for discrepancies based on multiple conflicting detected feature regions for a single detector. The weighted feature identification information based on the multiple feature detectors may then be aggregated (block 310) to determine a proper orientation of the received image (block 315). In one embodiment, an image orientation determination may be based on an aggregation of weighted image orientation estimates of the individual feature detectors. For example, each of the multiple weighted individual image orientation estimates (i.e., the image orientation determinations based on the individual detectors such as those described with respect to operation 200) may have an associated score (i.e., based on the assigned weight) and the scores may be combined to determine an image orientation. As will be described in greater detail below, in one embodiment, the individual image orientation estimates may include offset information (e.g., the difference between a typical alignment and the measured alignment of a particular identified feature at the estimated orientation) to improve the accuracy of operation 300. For example, the combined offset information from the multiple detectors may be required to fall within a certain angular range (e.g., ±5°) before the aggregate image orientation determination will be accepted. The image orientation determination based on the aggregate information may be effected by rotating the received image to the determined orientation (block 240) and storing the image in a memory in the rotated orientation—with, or without, "undo" information (block 245).

Although operations 200 and 300 have been described separately, it will be understood that portions of the described operations may be combined. For example, a computationally efficient detector may be utilized to make an initial orientation decision and a more accurate detector may be applied thereafter to verify the orientation. Such an approach may increase the computational efficiency of the more accurate detector. For example, because it can initially be assumed that the quick detector made the proper orientation decision, the efficiency of a more accurate detector (such as a face detector) can be increased by ignoring other potential orientations in an attempt to verify the initial orientation determination. As such, the more accurate detector may be applied to a smaller subset of image portions (e.g., those portions having an orientation that matches the initial orientation determination). It should also be noted that operations 200 and 300 may operate on a low resolution version of an image to increase operational efficiency. Moreover, the operations may run on a copy of the image in a background thread or on a graphics processing unit.

Figure 4A:
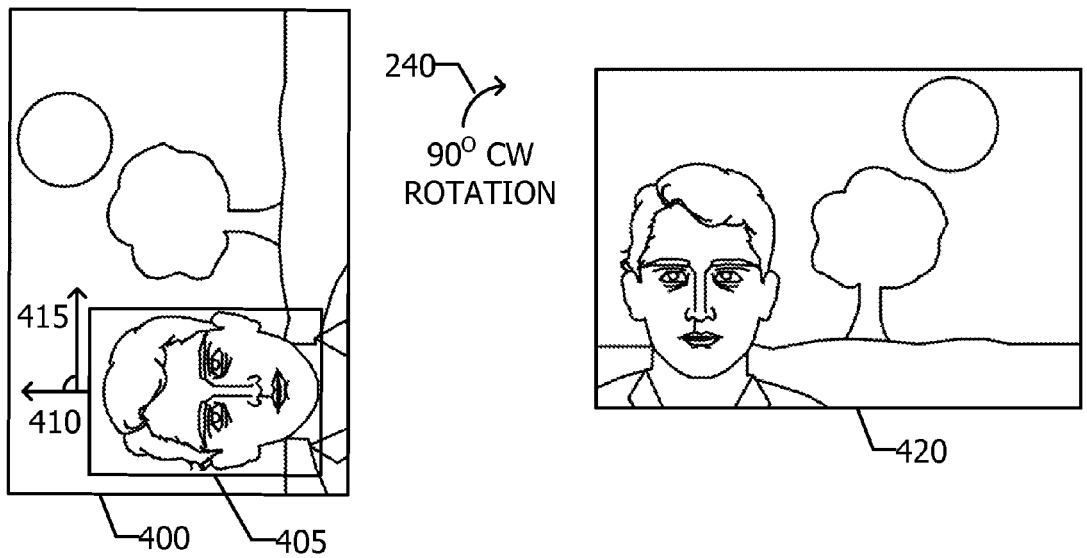
FIGS. 4A through 4C graphically illustrate image orientation operations in accordance with various embodiments.

Referring to FIG. 4A, an image having orientation 400 is received. In accordance with operation 200, a face detector may identify detected feature region 405 having a feature alignment vector 410. Because the face detector is associated with a "typical" vertical alignment 415, the difference between the directional component of feature alignment vector 410 and "typical" alignment 415 may result in the determination the image should be rotated 90° clockwise to orientation 420. If a confidence value associated with the determined orientation exceeds a threshold, the image may be rotated and saved according to orientation 420.

Figure 4B:
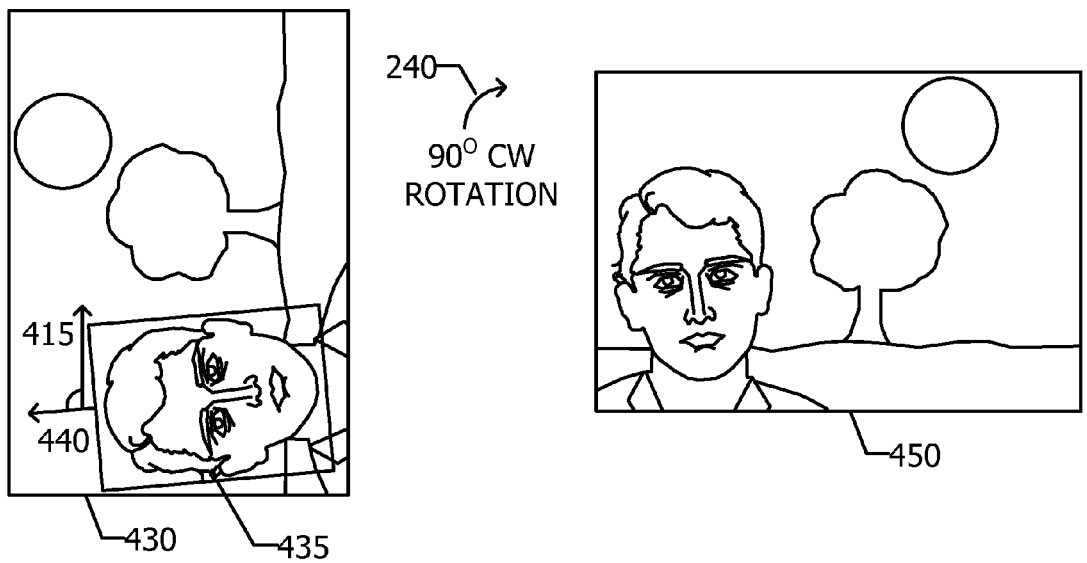

Referring to FIG. 4B, the subject in a received image having orientation 430 has a slightly rotated face with respect to the subject in the received image of FIG. 4A. In accordance with operation 200, a face detector may identify detected feature region 435 having a feature alignment vector 440. Although the difference between the directional component of feature alignment vector 440 and "typical" alignment 415 does not precisely correspond to one of the four main image orientations (e.g., 0°, 90°, 180°, and 270°), it may still be determined that the image should be rotated 90° clockwise to orientation 450 because the angular difference falls within a predetermined range (e.g., 90°±15°) for that orientation. If a confidence value associated with the determined orientation exceeds a threshold, the image may be rotated and saved according to orientation 450.

Figure 4C:
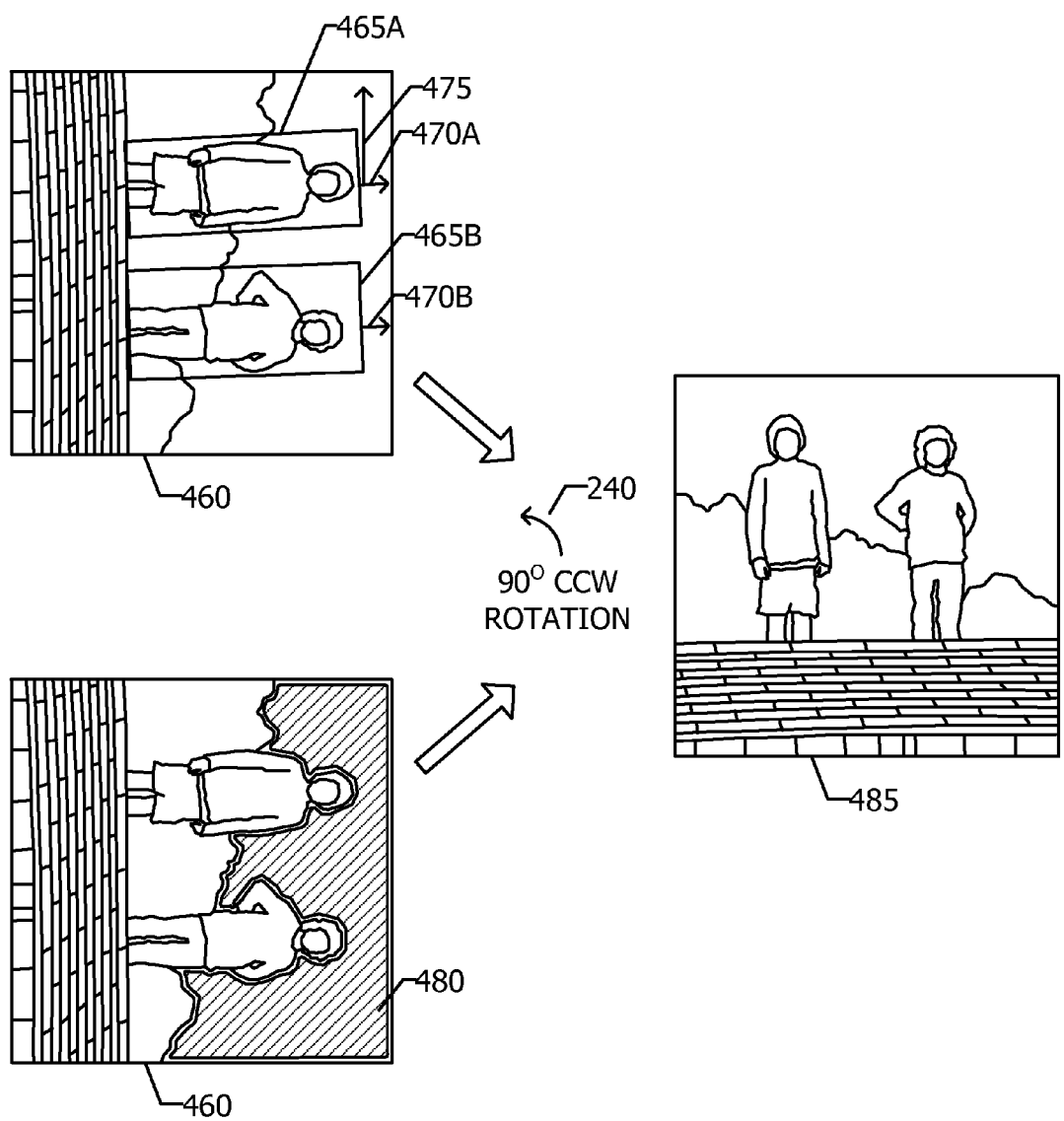

Referring to FIG. 4C, an image having orientation 460 is received. A person detector identifies detected feature regions 465A and 465B having feature alignment vectors 470A and 470B, respectively. A sky detector identifies area 480 as a detected sky region. In accordance with operation 300, based on a combination of the differences between the directional components of feature alignment vectors 470A and 470B as compared to "typical" person alignment 475, it may be determined that the image should be rotated 90° counter-clockwise to achieve the proper orientation. It may also be determined based on the position of area 480 that the image should be rotated 90° counter-clockwise to achieve the proper orientation of the photographed scene. The individual detector image orientation estimates may be weighted according to detector accuracy, confidence, and detected feature discrepancies and combined to form an aggregate image orientation determination. As noted above, each individual detector image orientation determination may be associated with an orientation offset. For example, because feature alignment vectors 470A and 470B have directional components (in orientation 460) that result in an in-plane rotational variance with respect to "typical" alignment 475 of less than 90°, the individual image orientation estimate based on the person detector may be a 90° counter-clockwise rotation having an associated 3° offset (to account for the difference between the directional component of the feature alignment vectors and the "typical" alignment in the rotated orientation). Because each of the person detector and sky detector agree on an image orientation, it may be determined that the image should be rotated to orientation 485 if the weighted combination of the individual orientation offsets is within a predetermined range (e.g., ±5°). In one embodiment, the image may be rotated to an orientation only if the individual image orientation estimates agree unanimously. In another embodiment, the image may be rotated to a specified orientation if a certain percentage of the individual image orientation estimates agree on the orientation.

Figure 5:
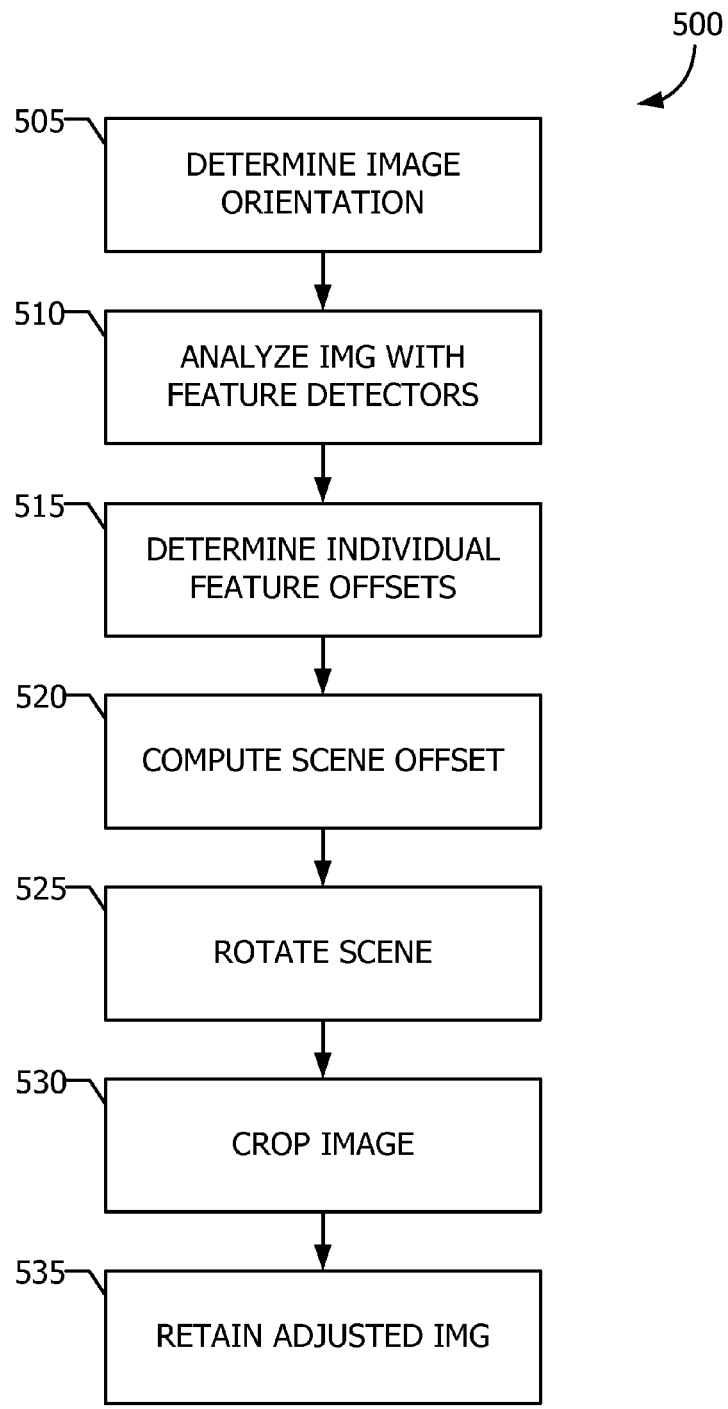
FIG. 5 is a flowchart that illustrates an image straightening operation in accordance with one embodiment.

Referring to FIG. 5, image straightening operation 500 may adjust the photographed scene such that it is properly aligned at the selected image orientation. Straightening operation 500 may begin with the determination of a proper image orientation as described above (block 505). In one embodiment, the selected image orientation may be determined based on one of automatic orientation operations 200 or 300. In another embodiment, image orientation may be selected manually, such as, for example, by a user editing the image with a photo management application. After an image orientation is selected, the image may be analyzed with one or more feature detectors (block 510). Each feature detector may identify a feature offset at the selected image orientation (block 515). As described briefly above with respect to the image orientation operation, a feature offset may refer to the angular difference between an identified feature's alignment and an expected alignment at the selected image orientation. Feature offsets may fall into two categories. A first category of proper feature offsets (e.g., an offset based on a subject's tilted head) should not be corrected by the straightening operation and a second category of improper offsets (e.g., an offset associated with the orientation of an image capture device at an angle other than one of the four main orientations) should be corrected by the straightening operation.

Because it may be difficult to distinguish between proper and improper offsets, in a typical embodiment, straightening operation 500 may be based on feature offsets from multiple feature detectors in order to accurately straighten the photographed scene. Therefore, if image orientation (block 505) was performed manually or based on operation 200, it may be necessary to subject the image to analysis by one or more additional feature detectors. However, the information associated with a particular feature detector utilized as part of an automatic image orientation operation (such as operations 200 and 300) may be saved with the image as image metadata. This information may include the feature offset. For example, if it is determined during an automatic image orientation operation utilizing a face detector that the difference between a detected face's alignment and a "typical" alignment is 87° and that the image should be rotated 90° clockwise, the image may be saved according to the rotated orientation and may have associated metadata indicative of a face detector feature offset of 3°. Accordingly, it may not be necessary to analyze an image with the same feature detector that was previously used to make an image orientation determination.

The feature offset information of the one or more applied feature detectors may be aggregated according to a straightening operation to determine an aggregate scene offset (block 520). Like the orientation determinations described above, each feature offset may be associated with a confidence value. The accuracy component of a confidence value for a particular detector may be different for an orientation operation as compared to a straightening operation. For example, while a face detector may be highly accurate for determining an image orientation, because a feature offset based on a detected face may commonly be associated with a proper feature offset, its accuracy component with respect to a straightening operation may be less than its accuracy component for an orientation operation.

In one embodiment, the straightening operation may compute a weighted average (e.g., incorporating the feature offset confidence values) of the individual feature offsets. In one embodiment, individual feature offset outliers (e.g., feature offsets having more than a certain percentage of a calculated standard deviation away from the weighted average) may not be included in the computation of the aggregate scene offset. In another embodiment, multiple straightening operations may be applied (e.g., inclusive of, exclusive of, and weighting differently certain feature offsets) and multiple straightened images based on the multiple calculated scene offsets may be presented to a user for selection of the most appropriate result.

After a scene offset is determined, the photographed scene may be rotated by an angle equal to the calculated scene offset (block 525). The image may optionally be cropped such that the straightened image maintains the same aspect ratio as the original image (block 530) and the straightened image may be saved in a memory (block 535). Like the image orientation operation, metadata may be retained such that the straightening operation may be "undone" and the original image recovered.

Figure 6:
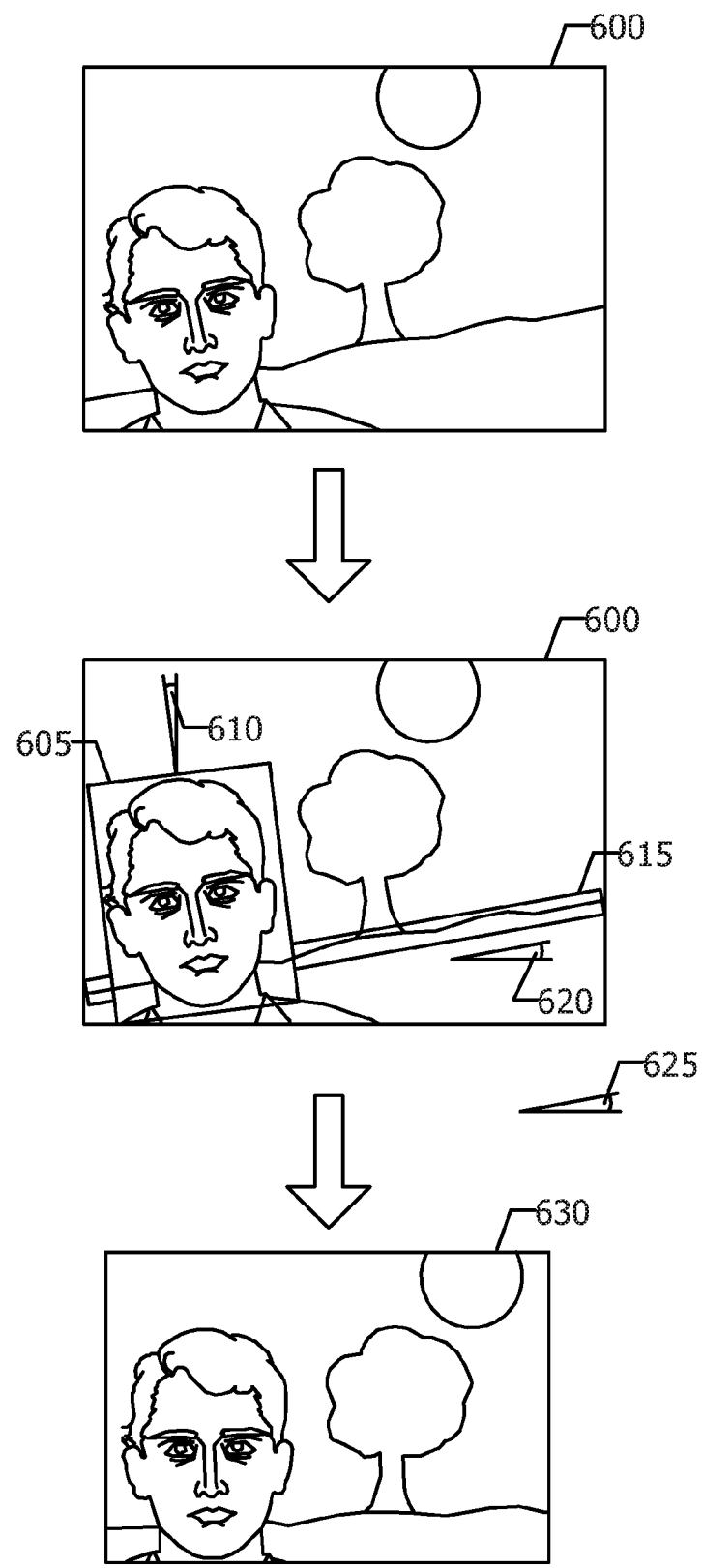
FIG. 6 graphically illustrates an image straightening operation in accordance with one embodiment.

Referring to FIG. 6, straightening operation 500 is illustrated with respect to example image 600. As illustrated, image 600 has been rotated to the proper one of the four main orientations (i.e., the scene is generally illustrated in the proper manner). However, the photographed scene in image 600 is skewed with respect to the proper presentation. In accordance with image straightening operation 500, image 600 may be analyzed by multiple feature detectors. In the illustrated embodiment, for example, a face detector may identify detected feature region 605 and a horizon detector may identify detected feature region 615. These detected feature regions may be associated with alignments that differ from "typical" alignments for the respective features as illustrated by offsets 610 and 620 respectively. The feature offsets may be assigned weights and aggregated to determine scene offset 625 as described above. It will be understood that image 600 may be analyzed with more (or fewer) than two feature detectors in which case additional feature offsets may be identified and may therefore contribute to the calculated aggregate scene offset. The photographed scene may then be rotated (maintaining the existing image orientation) to account for scene offset 625, and the resulting image cropped and saved in a memory as straightened image 630.

Figure 7:
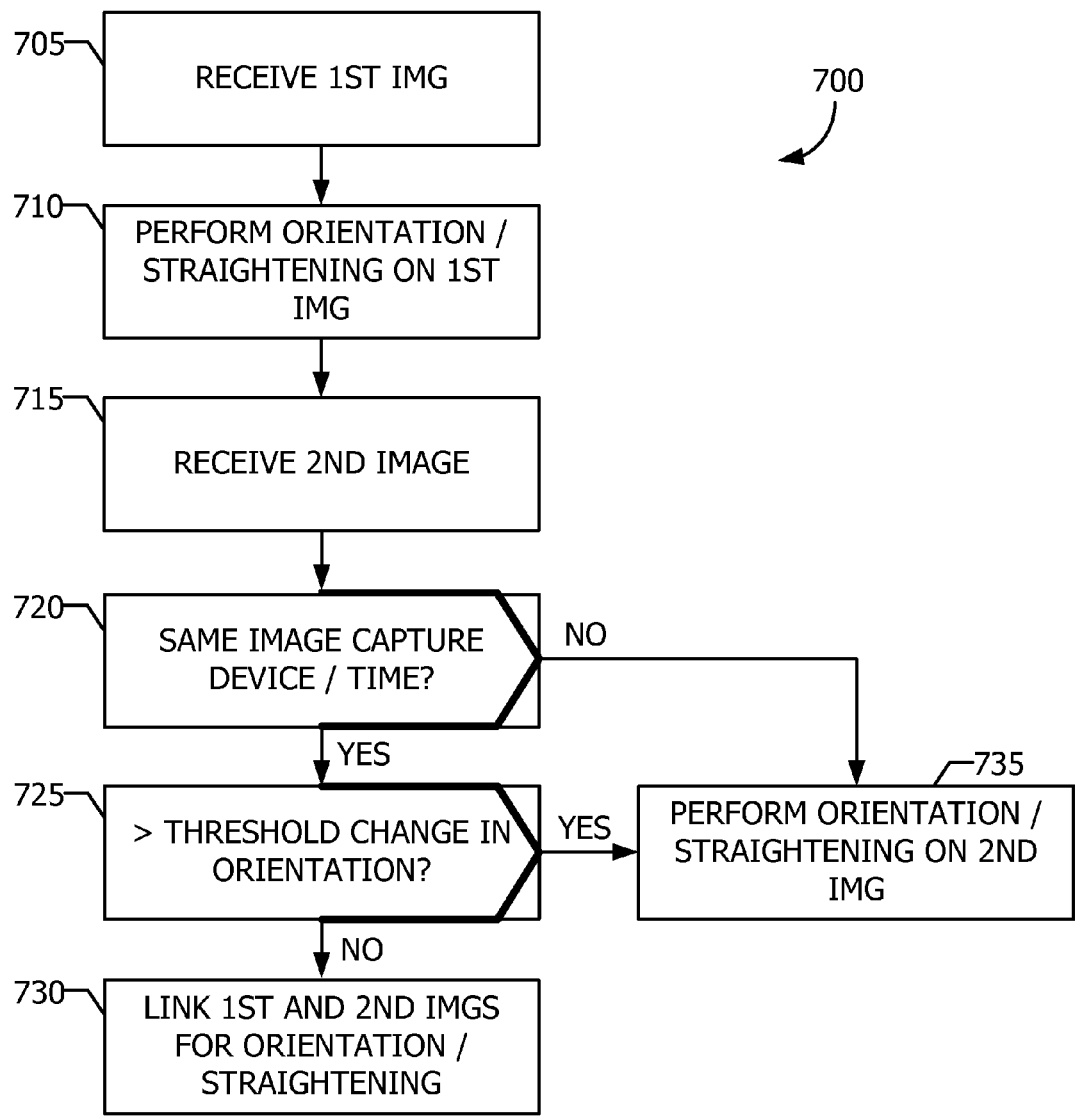
FIG. 7 is a flowchart that illustrates the linkage of images obtained by the same image capture device for purposes of image orientation and straightening operations.

Referring to FIG. 7, operation 700 may incorporate metadata associated with a received image to improve the efficiency and accuracy of the orientation and straightening operations. In the same manner as described above, a first image may be received (block 705) and orientation and straightening operations may be performed on the image (block 710). When a second image is subsequently received (block 715), it may be determined if the second image was captured by the same image capture device as the first image and whether the second image was captured in close temporal proximity to the first image (block 720).

Each of the first image and second image may include metadata that provides information about the image capture device used to obtain the image as well as a time the image was obtained, thereby allowing a determination of whether the first and second images were obtained with the same image capture device at approximately the same time. The image metadata may also include rotational information obtained from positional sensors (such as gyroscopes and/or accelerometers) that provide information regarding the orientation of the image capture device at the time each image was obtained. This rotational information might include readings for three rotational axes (one of which may be the camera rotation axis). If it is determined that the first and second images were obtained by the same image capture device in close temporal proximity (the "Yes" prong of block 720), the rotational information included in the metadata for the first and second images may be utilized to determine whether a change in the orientation of the image capture device during the interval between the capture of the first and second images exceeds a threshold (block 725). In one embodiment, the threshold may define a particular angular rotation about the camera rotation axis (i.e., the image-observer access that contributes to the in-plane rotation of the image). If the first and second images were not captured by the same image capture device at approximately the same time or if the rotational information indicates a change in orientation of the image capture device that exceeds the threshold (the "No" and "Yes" prongs of blocks 720 and 725 respectively), the orientation and/or straightening operations may be performed independently on the second image (block 735). If, however, it is determined that the rotational information does not indicate a change in orientation of the image capture device that exceeds the threshold (i.e., the rotational information indicates a small change in the orientation of the image capture device between the capture of the first and second images) (the "No" prong of block 725), the first and second images may be linked for purposes of the orientation and straightening operations (block 730). That is, the orientation and/or straightening determinations for the first image may influence the orientation and/or straightening determinations for the second image.

The linkage of two images captured by the same image capture device may increase the efficiency of the orientation operation. For example, in one embodiment, if the interval between the capture of the first and second images is of a short duration and there is a small change in the orientation of the image capture device, the orientation adjustment applied to the first image may simply be applied to the second image such that no further analysis of the second image is necessary. In another embodiment, the orientation operation may utilize the orientation determination for the first image as an initial orientation determination for the second image such that orientation-specific feature detectors (e.g., face detectors) may be applied to a smaller subset of image portions (e.g., those portions having an orientation that matches the initial orientation determination) based on the initial orientation determination.

The linkage of the first and second images may also improve the accuracy of the orientation operation. For example, if a parent takes a first photograph of a child running around at a park, the image orientation operation might rotate the image frame to an orientation in which the child is positioned upright. If the orientation operation then receives a second image of another child hanging upside down (captured soon after the first image), the orientation operation (e.g., based on the analysis of the second image with a face detector) may incorrectly determine that the image should be rotated to the orientation in which the child is positioned upright. However, based on the orientation determination for the first image in conjunction with rotational information that indicates that very little camera rotation occurred between the first and second images, the orientation operation may determine that the child in the second image must be upside down.

While the rotational information provided by an image capture device may allow the orientation operation to accurately determine that no significant rotational change (e.g., a 90° change between primary orientations) occurred during the interval between the capture of the first and second images, the information might be less reliable in terms of the precise angular adjustments of the image straightening operation. Nonetheless, in the same manner that the rotational information may be utilized to link images for purposes of the orientation operation, it might also be utilized to link images for purposes of the straightening operation. In one embodiment, to account for potential drift in the rotational information provided by an image capture device over time, a damping factor may be included in determining the weight to be accorded to a calculated scene offset for a first image with respect to a scene offset for a second image such that the effect of the prior scene offset on the subsequent scene offset decreases as the time interval between the capture of the first image and the second image increases.

Figure 8:
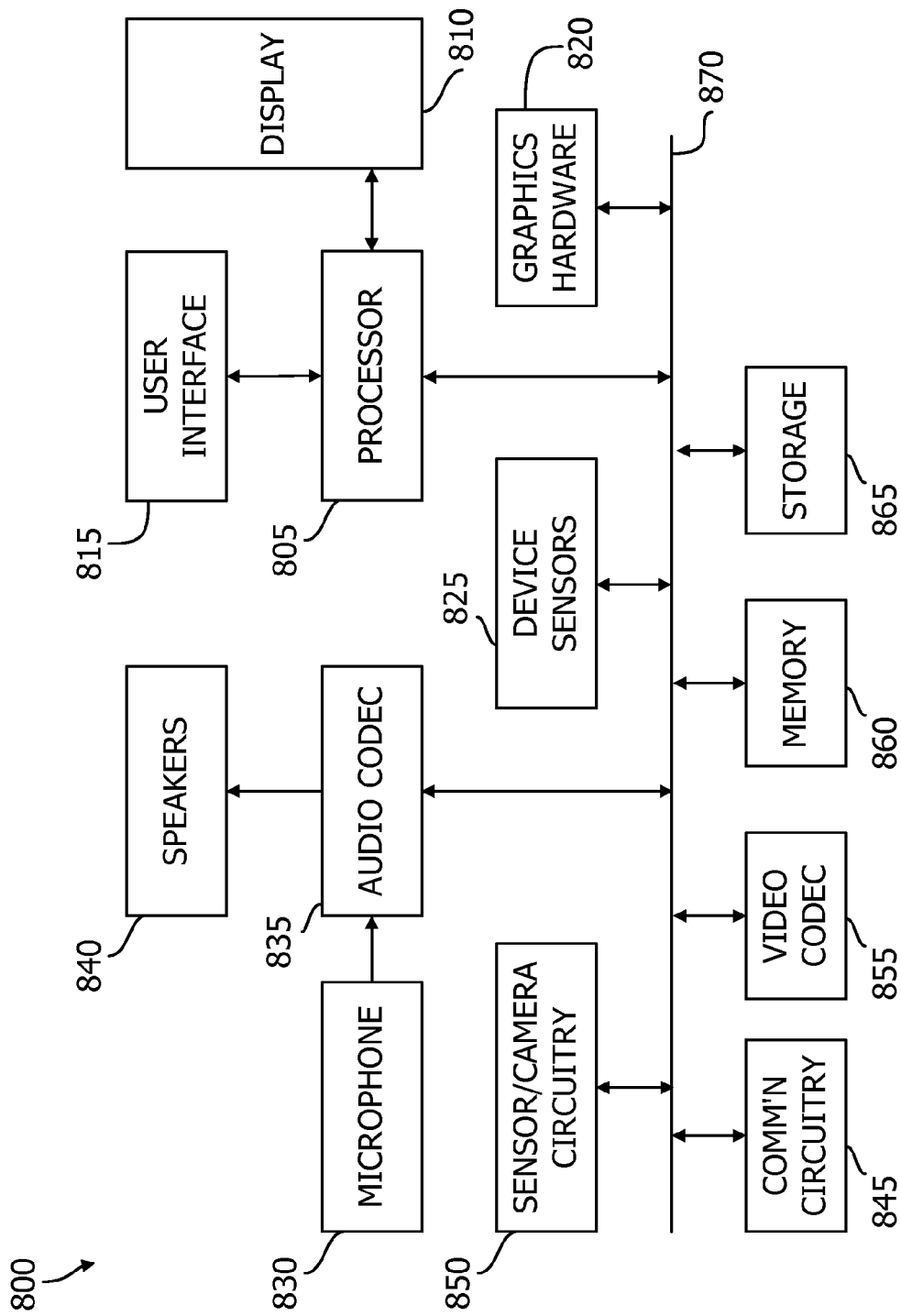
FIG. 8 is a block diagram for an illustrative electronic device in accordance with one embodiment.

Referring to FIG. 8, a simplified functional block diagram of illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a personal digital assistant (PDA), personal music player, mobile telephone, digital camera, notebook, laptop or a tablet computer, desktop computer, or server computer. More particularly, the above-described processes may be performed on a device that takes the form of device 800.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable graphics processing unit (GPU).

Sensor and camera circuitry 850 may capture still and video images that may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software (such as photo management software), preference information, device profile information, and any other suitable data. Storage 865 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
   receive an image;
   determine an orientation for the received image based, at least in part, on one or more identified features in the received image;
   identify an alignment of the one or more identified features in the received image;
   determine an offset between a known typical alignment and the identified alignment for each of the one or more identified features at the determined orientation;
   rotate the received image based, at least in part, on the determined offset to generate a straightened image; and
   save the straightened image in a memory.

2. The non-transitory program storage device of claim 1, further comprising instructions to cause the processor to analyze the received image with one or more feature detectors in a predetermined order.

3. The non-transitory program storage device of claim 2, wherein the predetermined order comprises an order based on feature detector computational efficiency.

4. The non-transitory program storage device of claim 2, wherein the predetermined order comprises an order based on feature detector accuracy.

5. The non-transitory program storage device of claim 1, wherein the instructions to cause the processor to determine an orientation for the received image further comprise instructions to cause the processor to assign an orientation confidence value to the determined orientation.

6. The non-transitory program storage device of claim 5, wherein the orientation confidence value comprises a detected feature confidence value associated with each of the one or more identified features.

7. The non-transitory program storage device of claim 5, wherein the orientation confidence value comprises a predetermined accuracy value associated with one or more feature detectors.

8. The non-transitory program storage device of claim 1, further comprising instructions to cause the processor to rotate the received image to the determined orientation.

9. The non-transitory program storage device of claim 1, wherein the instructions to cause the processor to determine an orientation for the received image comprise instructions to cause the processor to determine a difference between a known typical position of the one or more identified features and a position of the one or more identified features in the received image.

10. The non-transitory program storage device of claim 1, wherein the instructions to cause the processor to determine an orientation for the received image comprise instructions to cause the processor to determine a difference between a known typical alignment of the one or more identified features and an alignment of the one or more identified features in the received image.

11. The non-transitory program storage device of claim 1, wherein the instructions to cause the processor to determine an orientation for the received image comprise instructions to cause the processor to utilize rotational information from an image capture device used to obtain the received image and an orientation determination for a previously analyzed image obtained by an image capture device.

12. A device comprising:
   an image capture component;
   a memory; and
   a processor operatively coupled to the memory and the image capture component and configured to execute program code stored in the memory to:
      receive an image obtained with the image capture component;
      analyze the received image to identify a detected feature;
      determine an orientation for the received image based, at least in part, on the detected feature;
      determine an offset between a known typical alignment and an identified alignment of the detected feature at the determined orientation;
      rotate the image based, at least in part, on the determined offset to generate a straightened image; and
      save the straightened image in the memory.

13. The device of claim 12, wherein the detected feature comprises one or more human faces.

14. The device of claim 12, wherein the detected feature comprises intensity gradient information in the received image.

15. The device of claim 12, wherein the detected feature is identified based on a ranking of a plurality of available features.

16. The device of claim 12, wherein the program code to cause the processor to determine an orientation for the received image comprises program code to cause the processor to assign an orientation confidence value to the determined orientation.

17. The device of claim 16, further comprising program code to cause the processor to rotate the received image to the determined orientation.

18. A method, comprising:
- receiving, by a processor, an image obtained with an image capture device;
- analyzing, by the processor, the received image with a feature detector;
- determining, by the processor, a first image orientation for the received image based, at least in part, on a detected alignment of one or more features in the received image identified by the feature detector;
- rotating the received image to the first image orientation;
- determining, by the processor, a second image orientation for the received image based, at least in part, on a difference between a known typical alignment and the first image orientation;
- rotating, by the processor, the received image based, at least in part, on the determined second image orientation to generate a straightened image; and
- saving the straightened image in a memory.

19. The method of claim 18, wherein determining a second image orientation for the received image comprises determining an in-plane rotational difference between a known typical alignment and the first image orientation.

20. The method of claim 18, wherein the feature detector comprises a feature detector configured to identify human faces.

* * * * *